US006973627B1

(12) United States Patent
Appling

(10) Patent No.: US 6,973,627 B1
(45) Date of Patent: Dec. 6, 2005

(54) WEBSITE DISPLAY EMULATING A DISPLAY OF AN APPLICATION PROGRAM

(75) Inventor: Stephen Charles Appling, Acworth, GA (US)

(73) Assignee: Automated Logic Corporation, Kennesaw, GA (US), 3

( * ) Notice: Subject to any disclaimer, the term of this patent is extended or adjusted under 35 U.S.C. 154(b) by 404 days.

(21) Appl. No.: 09/747,299

(22) Filed: Dec. 22, 2000

(51) Int. Cl.[7] .................................................. G06F 3/00
(52) U.S. Cl. ...................................... 715/781; 715/517
(58) Field of Search ...................... 345/781; 715/501.1, 715/513, 517, 509, 781

(56) References Cited

U.S. PATENT DOCUMENTS

| 5,649,133 | A | * | 7/1997 | Arquie ........................ 345/764 |
| 5,867,154 | A | * | 2/1999 | Berstis et al. ................ 345/788 |
| 6,008,809 | A | * | 12/1999 | Brooks ........................ 345/792 |
| 6,061,700 | A | * | 5/2000 | Brobst et al. ................ 715/517 |
| 6,088,708 | A | * | 7/2000 | Burch et al. ................. 715/509 |
| 6,101,510 | A | * | 8/2000 | Stone et al. ................. 715/513 |
| 6,311,196 | B1 | * | 10/2001 | Arora et al. ................. 715/513 |
| 6,405,221 | B1 | * | 6/2002 | Levine et al. ............. 715/501.1 |

OTHER PUBLICATIONS

Turk, Re-Tiling Polygonal Surfaces, Jul. 1992, Computer Graphics, pp. 55-69.*

Cowart, Mastering Windows 3.1, Special Edition, 1993, SYBEX Inc., pp. 168, 170.*

* cited by examiner

*Primary Examiner*—Raymond J. Bayerl
*Assistant Examiner*—Dennis Bonshock
(74) *Attorney, Agent, or Firm*—Sutherland Asbill & Brennan LLP

(57) ABSTRACT

A website display configured to emulate the look and feel of an application program is created using a border webpage and a content webpage. The border webpage comprises a table having a plurality of border cells surrounding a center cell. The center cell includes an inline frame configured for displaying the content webpage. The border cells each display a corresponding border image. The border images combine to form a border around the inline frame. The border surrounding the inline frame is preferably a four-sided border. The table and its cells are invisible when the border webpage is displayed. When a navigation command is received for accessing and displaying a second content webpage, the second content webpage is displayed in the inline frame in place of the first content webpage, while the border webpage remains static. A resize command for resizing the display area of the web browser, causes the display area and the border webpage and the content webpage to be proportionately resized. Preferably, scroll bars are suppressed by not allowing the display area to be resized below a minimum point at which scroll bars would normally be displayed. Each border image displayed in the border cells of the table may comprise repeated images that are tiled. Tiling the border images in this manner avoid distortion when the border images are resized. In response to resizing the border cells, the repeated images are retiled accordingly.

17 Claims, 5 Drawing Sheets

WEBSITE DISPLAY EMULATING A DISPLAY OF AN APPLICATION PROGRAM

TECHNICAL FIELD

The present invention relates in general to a graphical display of a website. More particularly, the present invention relates to configuring the graphical display of a website to emulate the look and feel of an application program.

BACKGROUND

The graphical display of a typical application program provides a continuity of appearance that is comforting to the user. By way of example, the display of an application program may include objects or information that are dynamically modified within a seemingly fixed background. The appearance of a fixed background may be accomplished by way of common reference points that remain on the display screen as the other object or information are modified. In addition, the display of an application program typically includes a four-sided border that provides a finite and concrete appearance.

In contrast to an application program, a website tends to provide a graphical display that is not perceived by the user as being continuous, finite or concrete. A website may comprise multiple webpages, each webpage containing different data elements. Modern web browsers operate to load different webpage in succession into a main display area. Successive loading of webpages results in a discontinuity of appearance because no common reference point remains within the main display area as the first webpage disappears and the second webpage is loaded. In some cases, a disconcerting whitespace may even be displayed between successive webpages.

In addition, most webpages lack a clearly-defined right or bottom edge. The designer of a webpage thus has the ability to design a display that is infinitely tall and/or wide. Web browsers are typically configured to include scroll bars along the right and bottom edges of the display area in order to permit the user to view data that does not fit within the display area. Accordingly, depending on the size of the display screen and the display area of the browser, the appearance of the webpage may differ each time it is accessed by the user.

Therefore, there is a need in the art for configuring the graphical display of a website to have the look and feel of an application program.

SUMMARY OF THE INVENTION

Generally stated, the present invention is directed to simulating the look and feel of an application program within a website. A web browser retrieves a border webpage file that contains an instruction set for creating a border webpage that include a four-sided border. The four-sided border surrounds a main display area within the web browser display window. The four-sided border mimics a four-sided border that typically appears around the display of an application program. The four-sided border is created through the use of a table construct that is preferably dimensioned to have three rows and three columns. This table configuration yields a single center cell surrounded by eight border cells. The center cell may be used as the main display area of the web browser window. The center cell of the table may contain an inline frame for displaying a content webpage, while the border cells may be used for the display of border images that combine to form the four-sided border. The border images may comprise repeating images that are tiled end-to-end throughout each border cell.

One embodiment of the invention may include various selectable graphic objects positioned external to the four-sided border. For example, the web browser window may be partitioned into two frames, a first frame containing a webpage that includes the selectable graphic objects and the second frame containing the border webpage with its four-sided border and inline frame. The selectable graphic objects may be used to emulate a table of contents, selectable menu, tree structure, or other application functions. Each selectable graphic object may be selected by way of a user input command in order to navigate between different content webpages within a website, or to duplicate other application-like functionality. In the event that a selectable graphic object is used to navigate from one content webpage to another, the border webpage displaying the four-sided border may remain static, while the content webpage displayed in the inline frame changes. This provides continuity in appearance as a user navigates from one page to the next.

That the invention improves upon the drawbacks of prior website displays and accomplishes the advantages described above will become apparent from the following detailed description of the exemplary embodiments and the appended drawings and claims.

BRIEF DESCRIPTION OF THE DRAWINGS

FIG. 3, comprising

DETAIELED DESCRIPTION OF A PREFERRED EMBODIMENT

Figure 1:
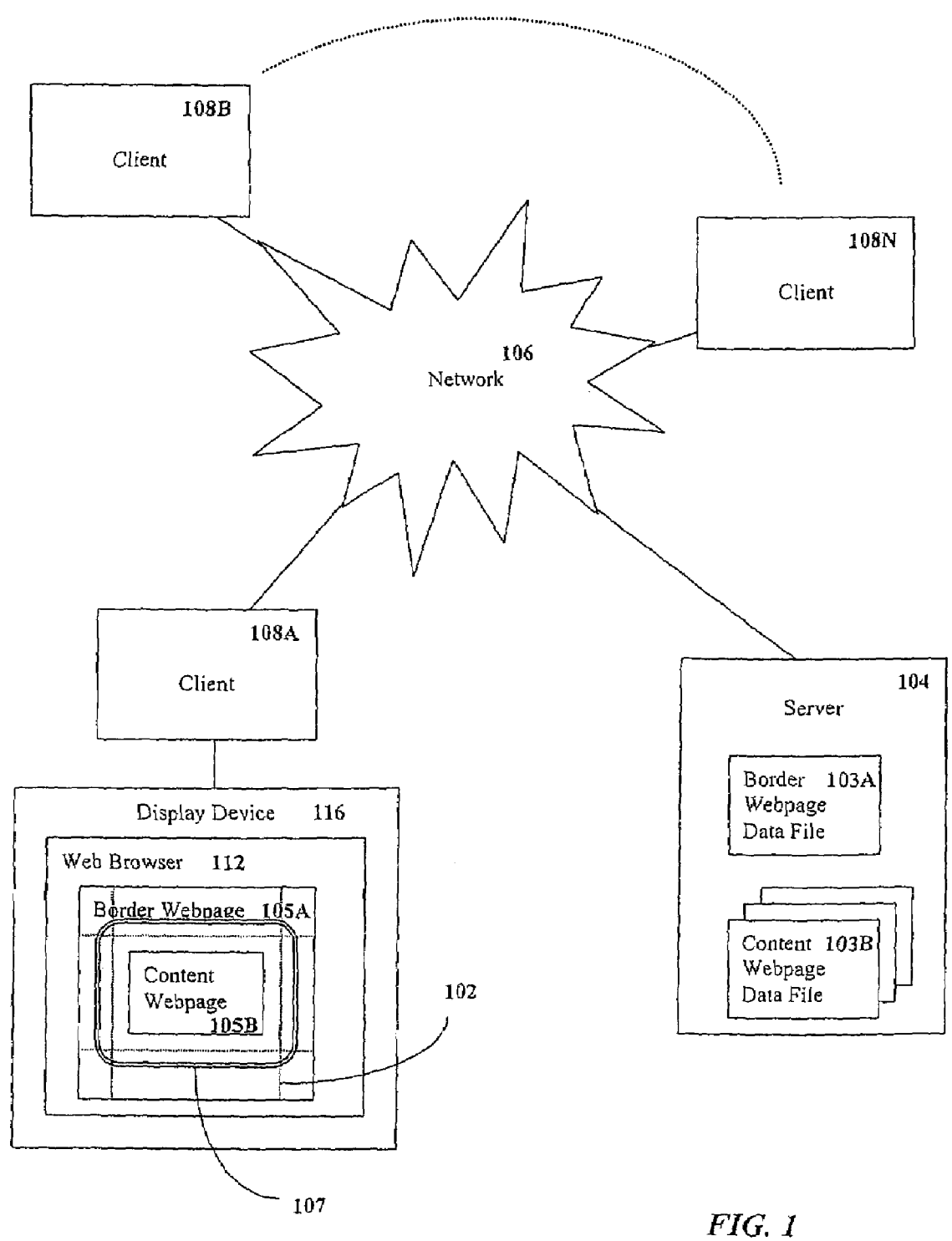
FIG. 1 is a block diagram illustrating an exemplary operating environment for the exemplary embodiments of the present invention.

The present invention is directed to displaying content in a web browser in such a manner as to emulate the look and feel of an application program. In accordance with an exemplary embodiment of the invention, a plurality of webpages are displayed in the window of a web browser in such a way as to produce a graphical display having a content display area bounded by a four-sided border. The four-sided border resembles a border surrounding the display of a typical application programs. In an exemplary embodiment, webpages are defined by webpage data files written in hypertext markup language ("HTML"). However, alternate embodiments may include webpage data files written using extensible markup language ("XML"), server-parsed hypertext markup language ("SHTML"), Javascript, Java, and so on. Thus, it is to be understood that the scope of the present invention is not restricted by a particular programming language and any references herein to HTML should be read by way of illustration and not by way of limitation.

Referring now to the drawings, in which like numerals represent like elements throughout the several figures, aspects of the present invention and a suitable operating environment will be described. The following sets forth the best mode of the invention as known to the inventors.

FIG. 1 and the following discussion are intended to provide a brief, general description of a suitable computing environment in which the invention may be implemented. While the invention will be described in the general context of a web browser application program executed by a personal computer in communication with a network, those skilled in the art will recognize that the invention may also be implemented in other environments and in combination with other program modules. Generally, program modules include routines, programs, components (such as stacks or caches), data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

As shown in FIG. 1, the present invention may be implemented in a traditional client-server environment. In accordance with an exemplary embodiment of the present invention, a border webpage data file 103A, or other data file, may produce a border webpage 105A when loaded into a web browser 112. The border webpage 105A includes table construct 102. The table 102 is preferably configured with three rows and three columns of cells, comprising a single center cell and eight border cells. Border images are displayed in the eight border cells. The border images combine to form the four-sided border 107. It should be appreciated that reference to a four-sided border is intended to signify a border that surrounds a main display area within a web browser. Accordingly, any border having greater or fewer than four sides that surrounds a main display area within a wed browser is also contemplated by the invention. The center cell of the table 102 includes an inline frame for the display of a content webpage 105B. The content webpage 105B results from loading a content webpage data file 103B into the inline frame of the border webpage 105A. The combination of the border webpage 105A and the content webpage 105B results in a graphical display for a website that emulates the display of an application program.

Typically, webpage data files 103A&B are stored on a server 104 connected to a network 106. Multiple related webpages may comprise a website. Alternate embodiments may store webpage data files 103A and/or 103B locally at the client 108A, or as distributed files on different elements of the network 106. The network 106 may comprise an internet, an intranet, a telephone wireline network, a cellular network, a broadband network, or any other wire-based and/or wireless network. The network 106 also connects to clients 108A–108N, which are operated by end users. As mentioned, clients 108A–108N may access webpage data files 103A&B by using a web browser 112, or similar application program, to connect to the server 104 via the network 106. The web browser 112 interprets a webpage data file 103A&B and displays a resulting webpage 105A&B. Typically, an end user may view the graphical display of a webpage 105A&B through a display monitor 116 connected to the client 108A.

Figure 2:
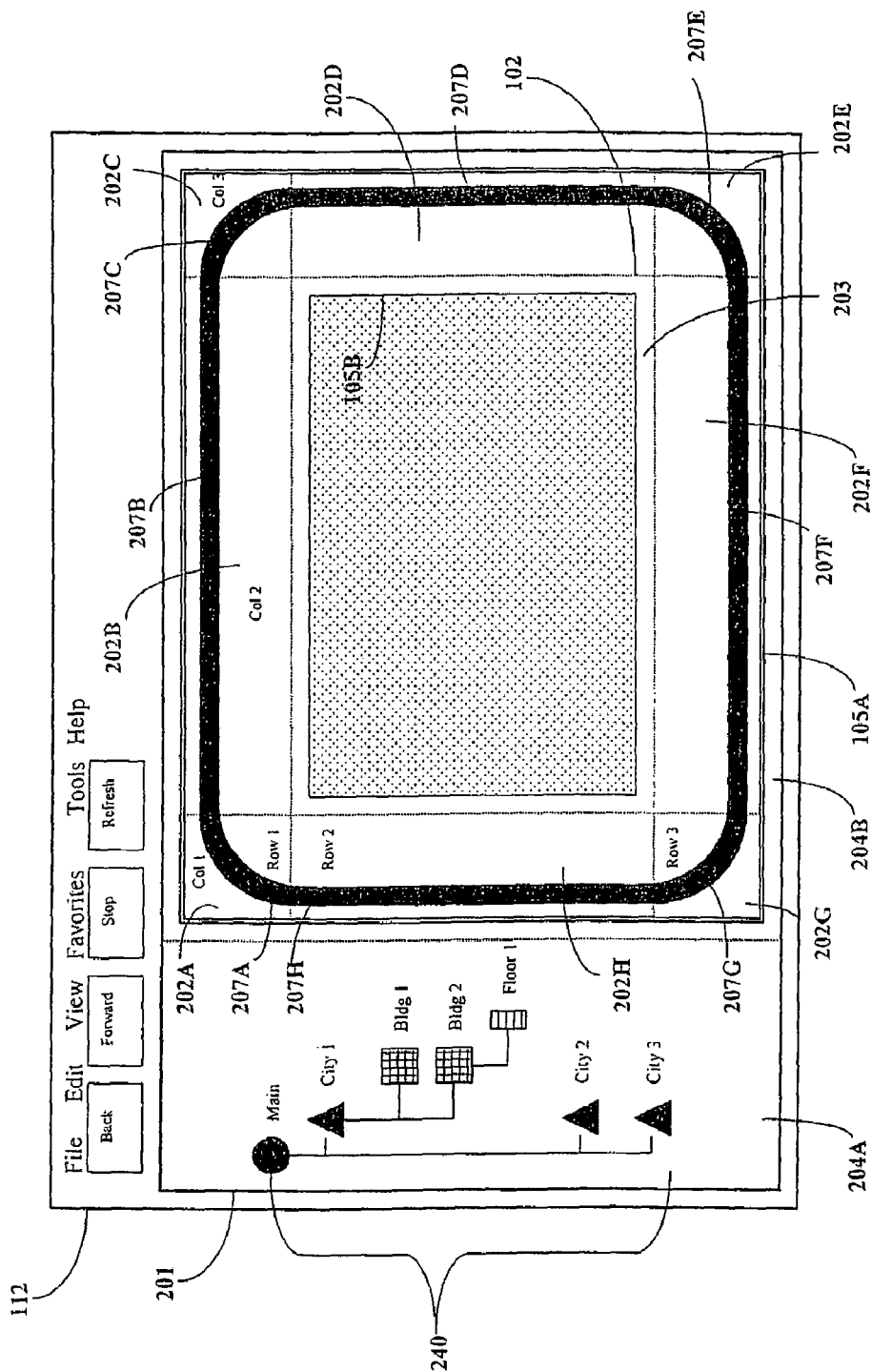
FIG. 2 is an illustration of an exemplary graphical display of a web site within a web browser in accordance with an exemplary embodiment of the present invention.

FIG. 2 is an illustration of an exemplary graphical display of a web site within a web browser 112 in accordance with an exemplary embodiment of the present invention. To achieve the appearance of a four-sided border surrounding a webpage that normally has no right or bottom boundary, an exemplary embodiment of the present invention makes use of a border webpage 105A and a content webpage 105B displayed within the web browser window 201. The border webpage 105A includes a table construct 102 consisting of multiple cells. In one embodiment, the table 102 may be defined to consist of nine cells, organized in three columns by three rows. Such a table configuration results in a single center cell 203 bounded by eight border cells 202A–H. The border cells 202A–H of the table 102 may be used for the display of border images, which combine to produce the four-sided border. The center cell 203 may include an inline frame that is used for displaying a content webpage 105B. An inline frame is an HTML element that is well known in the art. As shown in FIG. 2, the center cell 203 may be sized to occupy the majority of the border webpage 105A.

Optionally, the web browser window 201 may be partitioned into a first frame 204A and a second frame 204B, or any other number of frames. The border webpage 105B may be displayed in the second frame 204B, while one or more selectable graphic objects 240 may be displayed in the first frame 204A. Briefly, a selectable graphic object 240a may be configured to include hyperlinks and may serve to emulate a function of an application program. The concept of selectable graphic objects will be discussed in more detail with respect to FIG. 3.

The dimensions of the table 102 may be set to equal the entire display area of the web browser window 201 or the frame 204B in which the border webpage 105A is displayed. In an exemplary embodiment, the HTML commands "<table width=100%>" and "<table height=100%>" may be used to define the table dimensions relative to the size of the display area, rather than as absolute values. Dimensioning the table relative to the size of the display area ensures that the table 102 resizes proportionately when the web browser window 201 is resized.

A scripting language, such as JavaScript, may be used in an exemplary embodiment to ensure that the web browser window 201 may not be resized below a certain point. This minimum resize point may be defined as the size at which the browser would normally cause scroll bars to appear within the web browser window 201. By limiting the minimum size of the web browser window 201, scroll bars will be suppressed and the content webpage 105B will be resized so that its contents will be visible within the center cell 203 of the table 102. The above-mentioned scripting may be implemented in a manner well known to those skilled in the art.

The individual cells of the table 102 may be defined in such a manner that the center cell 203 is of a variable size, and all border cells 202A–H are of a fixed size in at least one dimension. In this manner, the dimensions of the center cell 203 are directly tied to the dimensions of the web browser window 201 or the frame 204B. Those skilled in the art will appreciate that the dotted lines defining the table 102 in FIG. 2 are for illustrative purposes only. The table 102, including all cell borders and the overall table border, may be made to be invisible when displayed in order to provide the illusion of a single display area with no visible joins between cells.

The four corner border cells 202A, 202C, 202E, and 202G of the table 102 may each display a unique border image designed to mimic a corner of a four-sided border. That is, the upper left corner border cell 202A may contain a border image 207A designed to mirror the upper left corner of a four-sided border, the upper right corner border cell 202C may contain a border image 207C mimicking the upper right corner of a four-sided border, and so on. The upper left corner border cell 202A is located in row 1, column 1 of the table 102. The upper right corner border cell 202C is located in row 1, column 3 of the table 102. The lower right corner border cell 202E is located in row 3, column 3 of the table 102. The lower left corner border cell 202G is located in row 3, column 1. Depending on the desired border, the four corner border cells 202A, 202C, 202E, and 202G may display identical border images or different border images. For example, the four corner border cells 202A, 202C, 202E, and 202G shown in FIG. 2 each display a different border image, namely border images 207A, 207C, 207E, and 207G respectively, because the shape of each border image must be rotated to match each corner.

The top center border cell 202B and bottom center border cell 202F may both extend along the entire width of the center border cell 203. The top center border cell 202B is located in row 1, column 2, while the bottom center border cell 202F is located in row 3, column 2 of the table 102. Similarly, the left center border cell 202H (located in row 2, column 1) and right center border cell 202D (located in row 2, column 3) may each extend along the height of the center cell 203. Horizontal border images 207B&F are displayed in both the top and bottom center border cells 202B&F, respectively, extending across the entire length thereof. The horizontal border images 207B&F displayed in the top and bottom center border cells 202B&F may be identical, as shown in the figure. Alternate embodiments may display different horizontal border images in the top center border cell 202B and the bottom center border cell 202F.

A single horizontal border image 207B is shown in the figure. However, using a single horizontal border image to fill a border cell may lead to distortion of the horizontal border image if the web browser window 201 and table 102 are resized in the horizontal direction. Therefore, the horizontal border image 207B may actually comprise multiple discrete horizontal border images that are repeated end-to-end within the top center border cell 202B. In the likely event that the top center border cell 202B does not accommodate an even number of discrete horizontal border images, one or more of the discrete horizontal border images may be truncated. The horizontal border image 207F within the bottom center border cell 202F may also comprise repeated discrete horizontal border images. The process of repeating an image end-to-end is commonly known as "tiling." Tiling a horizontal border image 207B&F within a border cell provides an illusion of a seamless horizontal border image within that border cell and reduces distortion due to manipulating the dimensions of the image itself.

The vertical border images 207D&H shown in the right center border cell 202H and the left center border cell 202H, respectively, may also be tiled to reduce image distortion when the browser window 201 and the table 102 are resized in the vertical direction. The vertical border images 207D&H displayed in the right and left center border cells 202D&H may be identical, as shown in the figure. Alternate embodiments may display different vertical border images in the right center border cell 202D and left center border cell 202H.

In the event that the web browser window 201 or frame 204B displaying the border webpage 105A is resized, the table 102 of the border webpage 105A is necessarily resized as well. According to one embodiment of the invention, when the table 102 is resized, the individual cells 202A–H of the table 102 may be resized in different manners, based on their position within the table 102. For example, as the web browser window 201 or frame 204B changes in size, cells occupying the first and third rows of the table 102 may be made to maintain a constant height, while cells occupying the second row of the table 102 may be resized in height. Similarly, cells in the first and third columns of the table 102 may be made to maintain a constant width, while the width of cells in the second column of the table 102 may change along with the width of the web browser window 210 or the frame 204B. Table 1 below summarizes the fixed and variable dimensions of each cell.

TABLE 1

Fixed/Variable Dimensions of Cells

| Cell | Width | Height |
| --- | --- | --- |
| Upper left border 202A | Constant | Constant |
| Top center border 202B | Variable | Constant |
| Upper right border 202C | Constant | Constant |
| Right center border 202D | Constant | Variable |
| Lower right border 202E | Constant | Constant |
| Bottom center border 202F | Variable | Constant |
| Lower left border 202G | Constant | Constant |
| Left center border 202H | Constant | Variable |
| Center 203 | Variable | Variable |

Using the fixed and variable cell dimensions shown above in Table 1, will allow the thickness of the four-sided border 107 to remain constant as it expand or contracts in height and/or width to fit the display area of the web browser window 201 or the frame 204B. Expanding the center border cells 202B, 202D, 202F and 202H in only one dimension avoids any undue warping or stretching of the tiled border images. As each center border cell 202B, 202D, 202F and 202H is resized, the border image contained within that cell is retiled accordingly. The center cell 203 may be resized along the horizontal and vertical directions in direct proportion to any resizing of the table 102. As shown in Table 1 above, no corner border cells 202A, 202C, 202E, 202G are resized in an exemplary embodiment so as to maintain consistent corner border images 207A, 207C, 207E, and 207G. Alternate embodiments may resize various cells of the table 102 in different manners without departing from the spirit or scope of the invention.

As mentioned, one or more selectable graphic objects 240 may be displayed in a first frame 204A of the web browser window 201. The selectable graphic objects 240 may be used within the web browser 112 to enhance the look and feel of an application program. Selectable graphic objects 240 may, for example, correspond to the menu layout of many common application programs. By way of illustration, multiple selectable graphic objects 240 may be used to represent a menu layout, wherein each selectable graphic object may bear a hierarchical relationship to other selectable graphic objects. For example, multiple selectable graphic objects 240 may be arranged in a "tree" structure, wherein a first level of selectable graphic objects 240 represents a geographical region, a second level of selectable graphical objects 240 represents individual cities within the geographical region, a third level of selectable graphic objects 240 represents different buildings within each city, and a fourth level of selectable graphic objects 240 represents floors within each building. Within a tree-like structure, a subordinate selectable graphic object 240 may be hidden from view until the corresponding dominant selectable graphic object is selected. The selectable graphic objects 240 may contain hyperlinks used to navigate from one content webpage 105B to another.

Selectable graphic objects 240 may also be displayed internal to the four-sided border 107. When selectable graphic objects 240 are displayed inside the four-sided border 107 and are used for navigation between content webpages 105B, any subsequently loaded content webpage 105B should be loaded into the center cell 203 (i.e., into the inline frame) of the table 102 of the border webpage 105A.

Figure 3A:
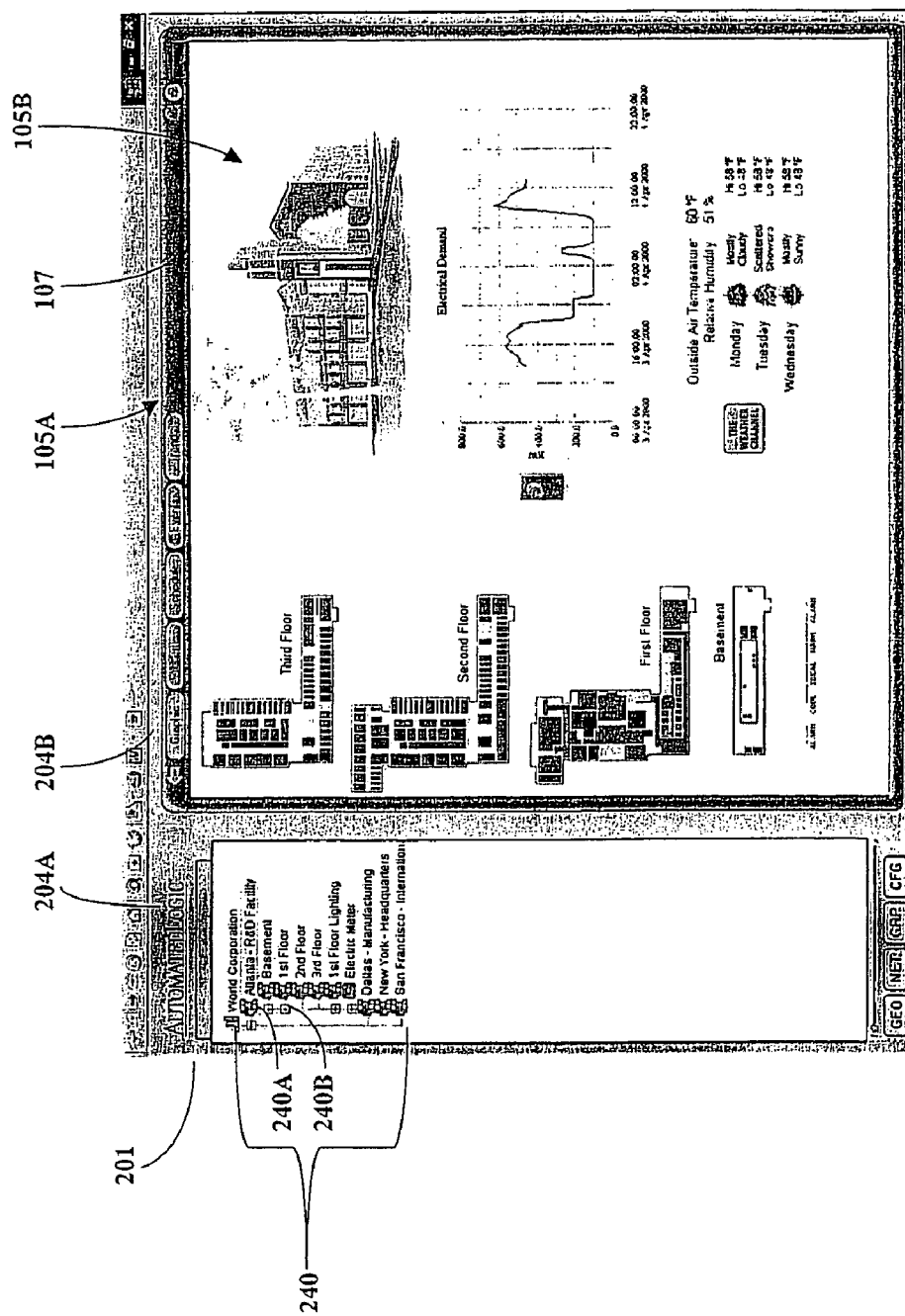
FIG. 3A and FIG. 3B, illustrates a website display that has been configured to resemble the display of an application program in accordance with an exemplary embodiment of the present invention.
Figure 3B:
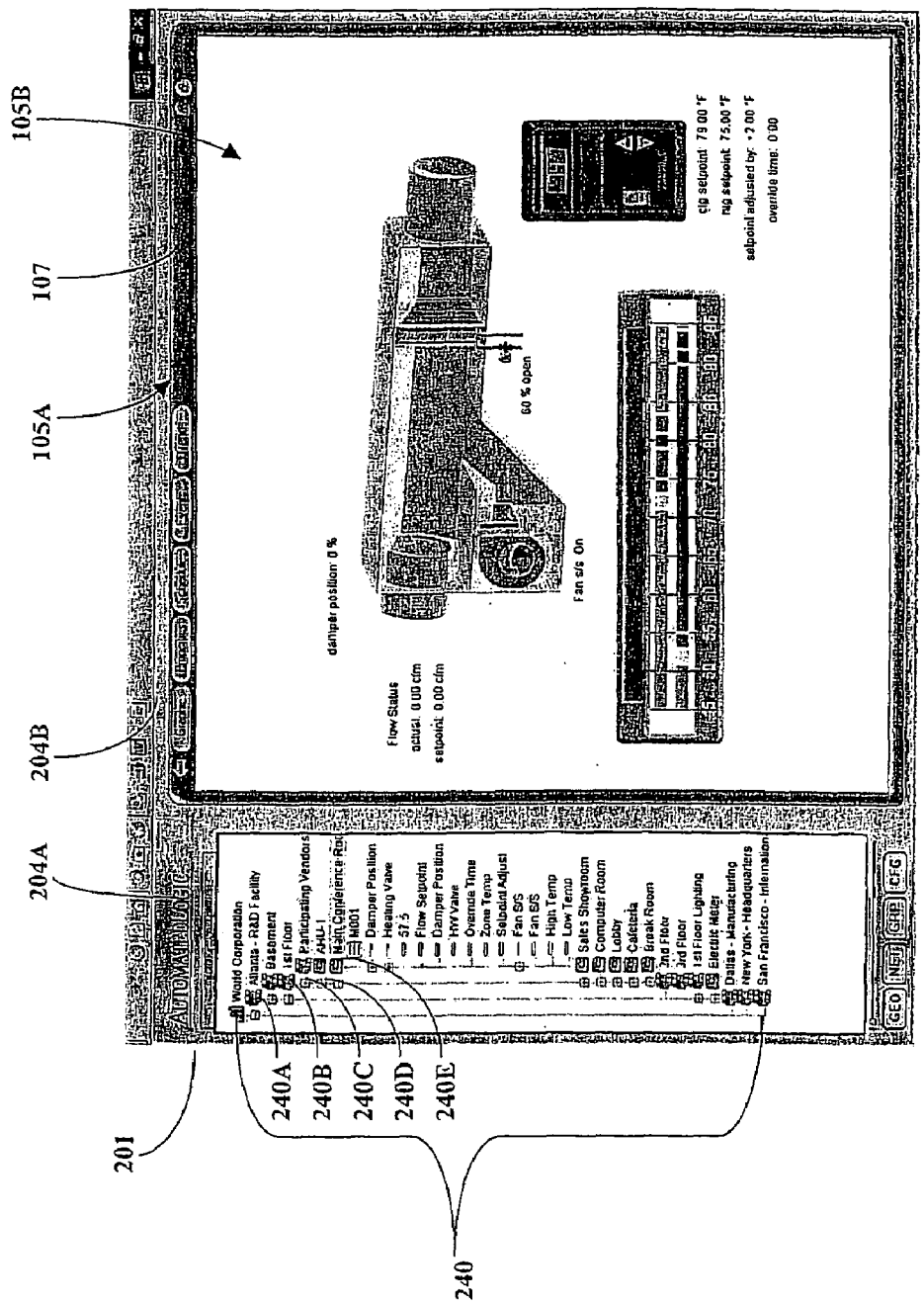

FIG. 3, comprising FIG. 3A and FIG. 3B, illustrates a website display that has been configured to resemble the display of an application program in accordance with an exemplary embodiment of the present invention. Beginning with FIG. 3A, a web browser window 201 is shown having a first frame 204A and a second frame 204B. Displayed in the first frame 204A is a first webpage that includes several selectable graphic objects 240 arranged in a tree structure. Although not plainly apparent to the user, displayed in the second frame 204B is a border webpage 105A and a content webpage 105B. The border webpage 105A displays the four-sided border 107. The four-sided border is made up of individual border images displayed in the border cells of an invisible table construct. An inline frame is included in the center cell of the invisible table. The content webpage 105B is displayed by the inline frame. Thus, the content webpage 105B is surrounded by a border, which helps to provide the website with a look and feel of an application program.

The selectable graphic objects 240 may be configured with hyperlinks to allow the user to enter navigation commands. In particular, a prior selection of the "Atlanta—R&D Facility" selectable graphic object 240A triggered the activation of a hyperlink to the content webpage 105B that is displayed in the second frame 204B. Within the tree structure of selectable graphic objects 240, selection of a dominant graphical object may cause the display of a previously hidden subordinate graphical object. By way of illustration, the "1$^{st}$ Floor" selectable graphic object 240B is flanked by a "+" icon to indicate that subordinate graphical images are hidden from view. Selection of the "1$^{st}$ Floor" selectable graphic object 204B will result in the display of a "Participating Vendors" selectable graphic object 240C, a "AHU-1" selectable graphic object 204D, and a "Main Conference Room" selectable graphic object 204E, as is shown in FIG. 3B. As is also shown in FIG. 3B, selection of the "Main Conference Room" selectable graphic object 204E results in the display of additional subordinate selectable graphic objects and the activation of a hyperlink to the new content webpage 105B displayed in the second frame 204B. Thus, it may be seen that the selectable graphic objects in the first frame 204A may be used to navigate among content webpages 105B in the second frame 204B, while the border webpage 105A and its four-sided border 107 remain static.

Figure 4:
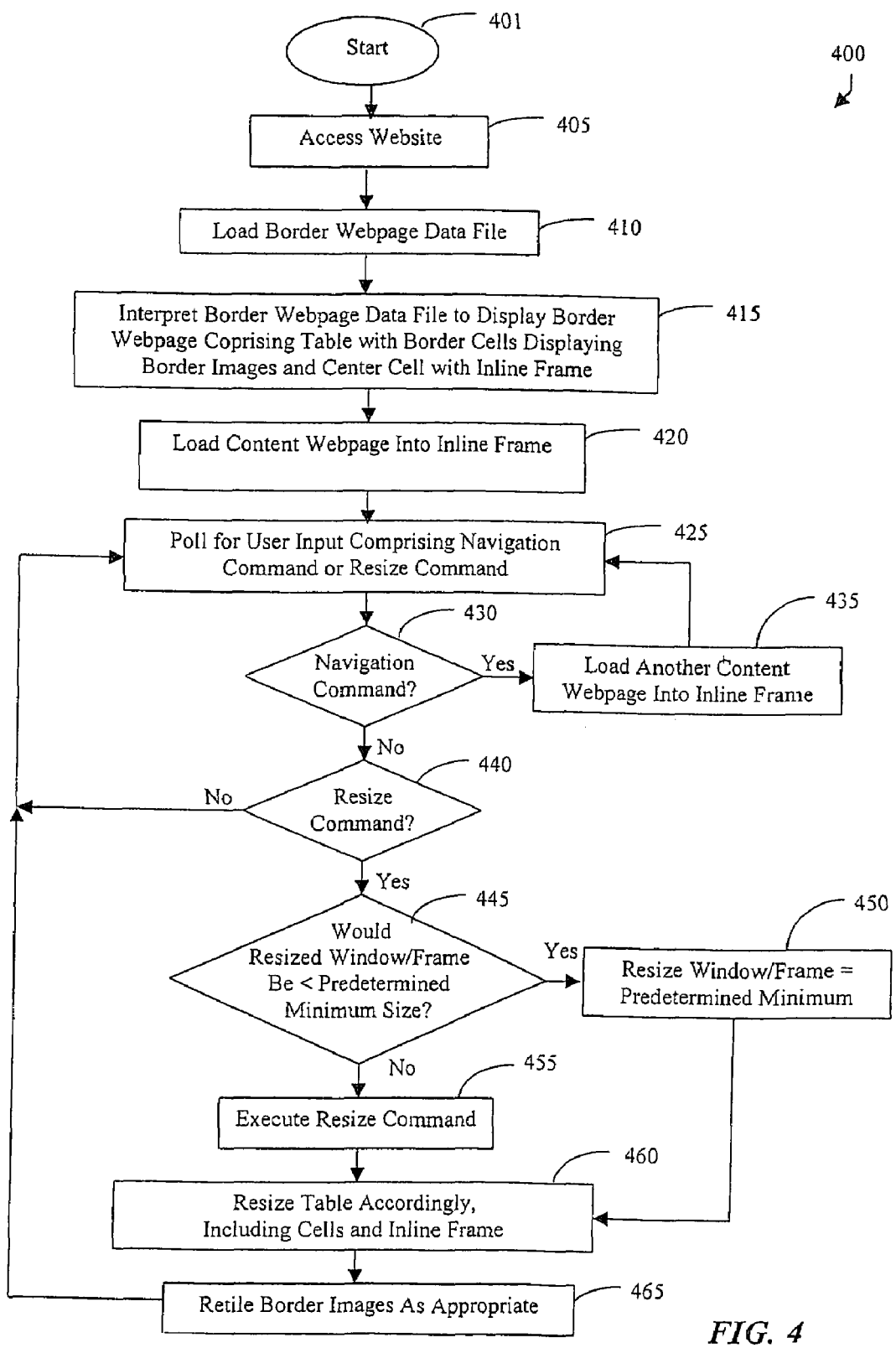
FIG. 4 is a flowchart illustrating operation of an exemplary method for configuring a website display to resemble the display of an application program.

FIG. 4 is a flowchart illustrating an exemplary method 400 for configuring the display of a website with a four-sided border. The flowchart begins at starting block 401 and proceeds to step 405, where a user operates a web browser to access a website that is defined by an underlying border webpage data file and a plurality of content webpage data files. The web browser loads the border webpage data file in step 410. In step 415, the web browser interprets the border webpage data file and displays the resulting border webpage. The border webpage includes a table construct that preferably comprises a center cell and a plurality of border cells. Border images may be displayed within the border cells of the table in such a manner as to form a four-sided border around the center cell. Border images may be defined by any image data file format, such as "jpeg," "bmp," "pict," "tiff" "gif," etc. The center cell may be configured to include an inline frame that functions as an independent web browser. At step 420, a content webpage data file is retrieved and interpreted by the inline frame and the resulting content webpage is displayed in the center cell of the table.

At step 425 the web browser awaits a user input comprising a navigation command or a window/frame resize command. A window/frame resize command instructs the web browser to alter the size of the web browser display window, or a frame thereof, and its contents. A navigation command instructs the browser to access and interpret another content webpage data file and to display the resulting content webpage. At step 430, the web browser determines whether a received user input command comprises a navigation command. If so, the method progresses to step 435 where another content webpage is loaded into the center cell of the table of the border webpage. It should be noted that the border webpage remains static as the navigation command is executed. After completing a navigation command at step 435, the method returns to step 425 to poll for further user input.

If it is determined at step 430 that the user input command is not a navigation command, the method proceeds to step 440, where it is determined whether the input command is a window/frame resize command. If a window/frame resize command is detected, a determination may be made at step 445 as to whether execution of the resize command would cause the web browser window or frame to be smaller than a predetermined minimum size. As previously mentioned, the predetermined minimum size may be set in order to prevent the web browser from automatically displaying scroll bars. If execution of the resize command would cause the web browser window or frame to be smaller than the predetermined minimum size, the browser window or frame is instead resized to the predetermined minimum size at step 450. However, if execution of the resize command would not cause the web browser window or frame to be smaller than the predetermined minimum size, the resize command is executed at step 455.

When the web browser window or frame thereof is resized at step 450 or step 455, the border webpage is resized accordingly, including its table and the inline frame, at step 460 and the border images within the border cells of the table are retiled at step 465. Those skilled in the art will appreciate that resizing the web browser window or frame, the border webpage, and the content webpage may, in practice, occur at the same time or in a difference sequence than described above. Thus, the above description is provided merely to illustrate the logical operation of an exemplary embodiment of the invention and is not intended to be limiting as to the sequence or timing of the steps. Following step 460, the method is repeated by returning to step 425 and polling for further user input.

From a reading of the description above pertaining to exemplary embodiments of the present invention, modifications and variations thereto may become apparent to those skilled in the art. For example, those skilled in the art will appreciate that the present invention may be practiced in conjunction with any program module capable of displaying webpages and is thus not limited by the above recitations of a web browser. Many other modifications and additional features will also become evident in view of the preceding description of exemplary embodiments of the invention. It should be appreciated that many features and aspects of the present invention are described above by way of example only and are therefore not intended to be interpreted as required or essential elements of the invention, unless so stated. Accordingly, the foregoing relates only to certain embodiments of the invention and numerous changes may be made therein without departing from the spirit and scope of the invention as defined by the following claims.

I claim:

1. A method for configuring the display of a website to emulate the look and feel of an application program, comprising:
   in response to a navigation command to access and display a content webpage, accessing and displaying a border webpage comprising a table comprising a plurality of border cells surrounding a center cell, the center cell including an inline frame and the border cells each displaying a corresponding border image, the border images combining to form a border around the inline frame;
   in response to accessing and displaying the border webpage, causing the inline frame to access and display the content webpage in the inline frame, wherein the content webpage is displayed entirely within the inline frame, and wherein the number of said plurality of border cells surrounding said center cell remains fixed, and
   in response to a second navigation command to access and display a second content webpage, replacing the previously displayed content webpage with the second content webpage in the inline frame and accessing the second content webpage,
   wherein the border webpage and the content webpage are displayed in a display area of a web browser; and
   wherein the method further comprises, in response to a resize command for resizing the display area of the web browser, displaying the border webpage and the content webpage, resizing the plurality of border cells, and retiling the repeated images accordingly.

2. The method of claim 1, wherein the border comprises a four-sided border.

3. The method of claim 1, wherein the table and its cells are invisible when the border webpage is displayed.

4. The method of claim 1, wherein the border cells comprise a top left corner border cell, a top right corner border cell, a bottom right corner border cell, a bottom left corner border cell, a left center border cell, a right center border cell, a top center border cell, and a bottom center border cell;
   wherein a top left corner border image is displayed in the top left corner border cell;
   wherein a top right corner border image is displayed in the top right corner border cell;
   wherein a bottom right corner border image is displayed in the bottom right corner border cell;
   wherein a bottom left corner border image is displayed in the bottom left corner border cell;
   wherein a vertical border image is displayed in each of the left center border cell and the right center border cell; and
   wherein a horizontal border image is displayed in each of the top center border cell and the bottom center border cell.

5. The method of claim 1, wherein the resize command is for resizing both the height and width of the display area of the web browser; and
   wherein resizing the border webpage comprises:
      resizing both the height and width of the center cell and the inline frame,
      resizing the width of the top center cell without resizing the height of the top center cell,
      resizing the width of the bottom center cell without resizing the height of the bottom center cell,
      resizing the height of the left center cell without resizing the width of the left center cell, and
      resizing the height of the right center cell without resizing the width of the right center cell.

6. A method for configuring the display of a website to emulate the look and feel of an application program, comprising:
   accessing and displaying a border webpage comprising a table comprising a plurality of border cells surrounding a center cell, the center cell including an inline frame and the border cells each displaying a corresponding border image, the border images combining to form a border around the inline frame; and
   in response to accessing and displaying the border webpage, causing the inline frame to access and display the content webpage in the inline frame,
   wherein the content webpage is displayed entirely within the inline frame, wherein the number of said plurality of border cells surrounding said center cell remains fixed, and wherein each vertical border image displayed in the left center border cell and the right center border cell and each horizontal border image displayed in the top center border cell and the bottom center border cell comprises repeated images that are tiled; and
   wherein in response to a resize command for resizing the display area of a web browser displaying the border webpage and the content webpage, resizing the left center border cell, the right center border cell, the top center border cell, and the bottom center border cell, and retiling the repeated images accordingly.

7. The method of claim 6, further comprising:
   determining a minimum resize point for the display area, below which the web browser will display a scroll bar;
   in response to the resize command, determining whether execution of the resize command would cause the display area to be smaller than the minimum resize point; and
   in the event that execution of the resize command would cause the display area to be smaller than the minimum resize point, resizing the web browser display area to the minimum resize point.

8. The method of claim 6, wherein in response to the resize command:
   resizing both the height and width of the center cell and the inline frame,
   resizing the width of the top center cell without resizing the height of the top center cell,
   resizing the width of the bottom center cell without resizing the height of the bottom center cell,
   resizing the height of the left center cell without resizing the width of the left center cell, and
   resizing the height of the right center cell without resizing the width of the right center cell.

9. A system for configuring a display of a website to emulate the look and feel of an application program, comprising:
   a processor for executing a web browser for accessing and displaying website webpages stored on a remote server via a network;
   a display device coupled to the processor for displaying the website webpages; and
   an input device coupled to the processor for receiving commands for operation of the web browser;
   wherein, in response to a navigation command for accessing and displaying a content webpage, the web browser is caused to access and display a border webpage comprising a table comprising a plurality of border cells surrounding a center cell, the center cell including an inline frame and the border cells each displaying a corresponding border image, the border images combining to form a border around the inline frame;
   wherein, in response to the web browser accessing and displaying the border webpage, the inline frame is caused to access and display the content webpage in the inline frame, wherein the content webpage is displayed entirely within the inline frame, and wherein the number of said plurality of border cells surrounding said center cell remains fixed, and wherein in response to a resize command for resizing the display area of a web browser displaying the border webpage and the content webpage, causing the plurality of border cells to be resized, and causing the repeated images to be retiled accordingly.

10. The system of claim 9, wherein the border comprises a four-sided border;

and wherein the table and its cells are invisible when the border webpage is displayed.

11. The system of claim 9, wherein in response to a second navigation command to access and display a second content webpage, the web browser accesses the second content webpage and displays, separately from the previously displayed content webpage, the second content webpage in the inline frame.

12. The system of claim 9, wherein the border cells comprise a top left corner border cell, a top right corner border cell, a bottom right corner border cell, a bottom left corner border cell, a left center border cell, a right center border cell, a top center border cell, and a bottom center border cell;

wherein a top left corner border image is displayed in the top left corner border cell;

wherein a top right corner border image is displayed in the top right corner border cell;

wherein a bottom right corner border image is displayed in the bottom right corner border cell;

wherein a bottom left corner border image is displayed in the bottom left corner border cell;

wherein a vertical border image is displayed in each of the left center border cell and the right center border cell; and wherein a horizontal border image is displayed in each of the top center border cell and the bottom center border cell.

13. The system of claim 9, wherein the border webpage and the content webpage are displayed in a display area of a web browser; and wherein, in response to a resize command for resizing the display area of the web browser, the web browser proportionately resizes display area and the border webpage and the content webpage.

14. The system of claim 13, wherein the resize command is for resizing both the height and width of the display area of the web browser; and wherein resizing the border webpage comprises:
 resizing both the height and width of the center cell and the inline frame,
 resizing the width of the top center cell without resizing the height of the top center cell,
 resizing the width of the bottom center cell without resizing the height of the bottom center cell,
 resizing the height of the left center cell without resizing the width of the left center cell, and
 resizing the height of the right center cell without resizing the width of the right center cell.

15. A system for configuring a display of a website to emulate the look and feel of an application program, comprising:

a processor for executing a web browser for accessing and displaying website webpages stored on a remote server via a network;

a display device coupled to the processor for displaying the website webpages; and an input device coupled to the processor for receiving commands for operation of the web browser, wherein, in response to a navigation command for accessing and displaying a content webpage, the web browser is caused to access and display a border webpage comprising a table comprising a plurality of border cells surrounding a center cell, the center cell including an inline frame and the border cells each displaying a corresponding border image, the border images combining to form a border around the inline frame, wherein, in response to the web browser accessing and displaying the border webpage, the inline frame is caused to access and display the content webpage in the inline frame, wherein the content webpage is displayed entirely within the inline frame, and wherein the number of said plurality of border cells surrounding said center cell remains fixed, wherein each vertical border image displayed in the left center border cell and the right center border cell and each horizontal border image displayed in the top center border cell and the bottom center border cell comprises repeated images that are tiled, and wherein in response to a resize command for resizing the display area of a web browser displaying the border webpage and the content webpage, causing the repeated images to be retiled accordingly.

16. A website display generated in accordance with a method comprising:

at a network-connected server, receiving a request for accessing a content webpage, the content webpage defined by a content webpage data file stored in a memory accessible to the server;

in response to receiving the request, retrieving a border webpage data file and the content webpage data file from the memory, the border webpage data file defining a border webpage comprising a table comprising a plurality of border cells surrounding a center cell, the border cells each displaying a corresponding border image, the border images combining to form a border around the center cell, the center cell including an inline frame configured for display of the content webpage; and transmitting the border webpage data file and the content webpage data file to the web browser for display of the border webpage and the content webpage, wherein the content webpage is displayed entirely within the inline frame, wherein the number of said plurality of border cells surrounding said center cell remains fixed, and wherein in response to a resize command for resizing the display area of a web browser displaying the border webpage and the content webpage, resizing the plurality of border cells, and retiling the repeated images accordingly.

17. The website display of claim 16, the method for generation thereof further comprising:

at the network server, receiving a second request for accessing a second content webpage, the second content webpage defined by a second content webpage data file stored in the memory;

in response to receiving the second request, retrieving the second content webpage data file from the memory; and transmitting the second content webpage data file to the web browser for display in the inline frame.

* * * * *